(12) United States Patent
Schmale et al.

(10) Patent No.: US 11,565,471 B2
(45) Date of Patent: Jan. 31, 2023

(54) THREE-DIMENSIONAL PRINTING WITH DIFFUSER PLATE

(71) Applicant: HEWLETT-PACKARD DEVELOPMENT COMPANY, L.P., Houston, TX (US)

(72) Inventors: Joshua Schmale, Vancouver, WA (US); Robert Lawrence Winburne, Vancouver, WA (US); Randall West, Vancouver, WA (US); Tait A. Regnier, Vancouver, WA (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 1074 days.

(21) Appl. No.: 16/075,684

(22) PCT Filed: Jul. 6, 2017

(86) PCT No.: PCT/US2017/040939
§ 371 (c)(1),
(2) Date: Aug. 6, 2018

(87) PCT Pub. No.: WO2019/009908
PCT Pub. Date: Jan. 10, 2019

(65) Prior Publication Data
US 2021/0206094 A1 Jul. 8, 2021

(51) Int. Cl.
*B29C 64/35* (2017.01)
*B33Y 30/00* (2015.01)
*B29C 64/245* (2017.01)
*B33Y 40/20* (2020.01)

(52) U.S. Cl.
CPC ............ *B29C 64/35* (2017.08); *B29C 64/245* (2017.08); *B33Y 30/00* (2014.12); *B33Y 40/20* (2020.01)

(58) Field of Classification Search
CPC ..... B29C 64/153; B29C 64/35; B29C 64/357; B29C 64/245; B29C 64/255; B22F 12/30; B22F 10/70; B22F 10/73; B33Y 40/00
See application file for complete search history.

(56) References Cited

U.S. PATENT DOCUMENTS 6,328,491 B1 * 12/2001 Beehler .................... B41J 11/06
400/648
7,020,539 B1    3/2006 Kovacevic et al.
7,073,442 B2    7/2006 Fedor et al.
(Continued)

FOREIGN PATENT DOCUMENTS

CN    101495294    7/2007
RU    2564604 C1   10/2015
(Continued)

*Primary Examiner* — Joseph S Del Sole
*Assistant Examiner* — Ariella Machness
(74) *Attorney, Agent, or Firm* — Shook, Hardy & Bacon L.L.P.

(57) ABSTRACT

A three-dimensional printing system may include a build platform, the build platform including at least one hole defined through the build platform, a diffuser plate placed below the at least one hole to maintain an amount of build material between a lower surface of the build platform and an upper surface of the diffuser plate, and a flow channel defined around the diffuser plate and sealing the diffuser plate from atmosphere.

19 Claims, 6 Drawing Sheets

(56) References Cited

U.S. PATENT DOCUMENTS

| | | | |
|---|---|---|---|
| 8,185,229 B2 | 5/2012 | Davidson | |
| 9,610,735 B2 | 4/2017 | Yoo et al. | |
| 2002/0090410 A1* | 7/2002 | Tochimoto | B29C 64/357 |
| | | | 425/215 |
| 2004/0084814 A1* | 5/2004 | Boyd | B33Y 40/00 |
| | | | 264/497 |
| 2008/0006334 A1* | 1/2008 | Davidson | B33Y 30/00 |
| | | | 222/630 |
| 2014/0265034 A1* | 9/2014 | Dudley | B29C 64/124 |
| | | | 264/401 |
| 2015/0258744 A1 | 9/2015 | Muller et al. | |
| 2016/0318253 A1 | 11/2016 | Barnhart | |
| 2017/0036404 A1* | 2/2017 | Rengers | B29C 64/357 |

FOREIGN PATENT DOCUMENTS

| | | |
|---|---|---|
| WO | 2007039450 A1 | 4/2007 |
| WO | 2016055523 A1 | 4/2016 |

\* cited by examiner

THREE-DIMENSIONAL PRINTING WITH DIFFUSER PLATE

BACKGROUND

Additive manufacturing systems that generate three-dimensional objects on a layer-by-layer basis are convenient way for producing three-dimensional objects. Examples of additive manufacturing systems include three-dimensional printing systems. The quality of objects produced by additive manufacturing systems may vary widely based on the type of additive manufacturing technology used.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
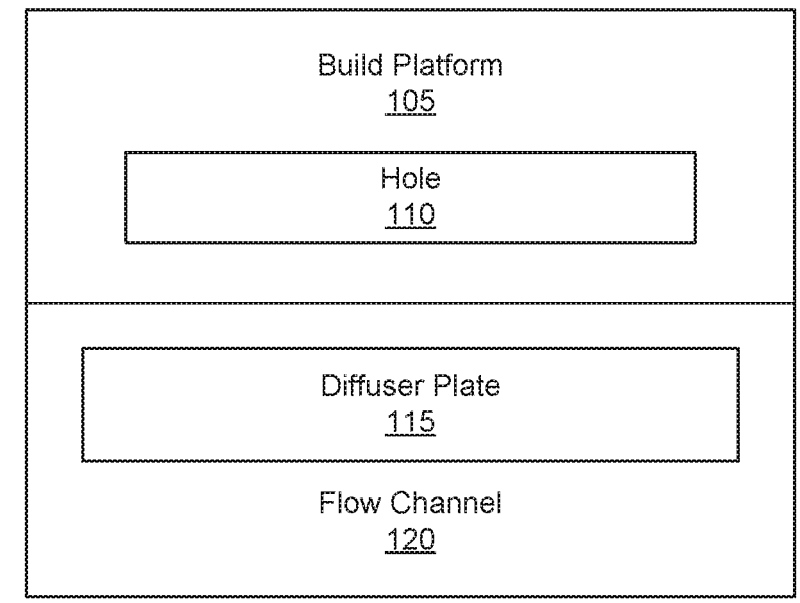
FIG. 1 is a block diagram of a three-dimensional printing system according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Three-dimensional (3D) printing includes any number of processes that may be grouped generally into subtractive and additive processes. One type of additive 3D printing technique is a build material and thermal fusing agent based technique in which a thin layer of, for example, polymer build material is spread on a bed to form a build material bed. An ejection device, such as an inkjet print head, is then used to print a fusing agent over portions of the build material bed corresponding to a thin layer of the 3D object to be formed. Then the bed of build material is exposed to a light or a heat source at least at the locations wherein the fusing agent has been deposited. The fusing agent absorbs more energy than the unprinted build material. The absorbed thermal energy causes the printed portions of the build material to melt and coalesce. This forms a solid portion that defines a layer of the 3D object. After that layer is formed, a new thin layer of build material is spread over the build material bed and the previous layer and the process is repeated to form additional layers until a complete 3D part is printed. In accordance with the present technology, such a technique can achieve fast throughput with good accuracy.

To absorb and convert the light energy to thermal energy, near-infrared dyes can be used in the fusing agent. These near-infrared dyes can absorb light wavelengths in the range of about 800 nm to 1400 nm and convert the absorbed light energy to thermal energy. When used with a light source that emits a wavelength in this range and a polymer build material that has a low absorbance in this range, the near-infrared dye causes the printed portions of the polymer build material to melt and coalesce without melting the remaining polymer build material on which no fusing agent has been printed. In other examples, carbon black may be used as a fusing agent.

Eventually, any unfused build material may be removed in order to reveal the 3D object created in the process. In some cases, the 3D object with its build material bed, often referred to as a build unit, is removed from the 3D printing device and delivered to a build material removal system that can both remove and confine the unused build material to a specific location. Additionally, another system that uses vacuum and air compressors may have to be purchased for the build material removal system. This increases the costs of the 3D printing process.

The present specification describes a 3D printing device that builds the 3D object and removes the build material bed after the build process using the same build chamber. This in situ removal of the unused or otherwise un-coalesced build material from the 3D object after the printing process has been completed avoids the use of other devices to remove the excess build material.

The present specification also describes a three-dimensional printing system that may include a build platform, the build platform including at least one hole defined through the build platform, a diffuser plate placed below the at least one hole to maintain an amount of build material between a lower surface of the build platform and an upper surface of the diffuser plate, and a flow channel defined around the diffuser plate and sealing the diffuser plate from atmosphere.

The present specification further describes a build platform that includes a first surface, a lower second surface, and at least one hole defined through the build platform, a diffuser plate adjustably coupled below the at least one hole, and an airflow channel defined around the diffuser plate and sealed against the second surface of the build platform.

The present specification also describes a three-dimensional object printing system that includes a build platform, including at least one hole defined therethrough, a diffuser plate adjustably coupled below the at least one hole, and an airflow channel defined around the diffuser plate and sealed against the second surface of the build platform As used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may or may not be included in other examples.

Turning now to the figures, FIG. 1 is a block diagram of a three-dimensional (3D) printing system (100) according to an example of the principles described herein. The 3D printing system (100) may include a build platform (105) with a hole (110) defined therethrough. The 3D printing system (100) also includes a diffuser plate (115) placed some distance below the hole (110) and a flow channel (120) defined around the diffuser plate (115) and sealing the diffuser plate (115) from atmosphere.

The build platform (105) may be any type of platform onto which a build material may be layered thereon. As described above, during operation of the 3D printing system (100), an initial layer of build material such as a polymer is layered on the upper surface of the build platform (105). However, in the examples provided herein the initial layer of build material may be layered on the build platform (105) such that an amount of build material falls through the holes (110) defined therein and lands on the diffuser plate (115). This continues until the build material has choked the flow of build material through the holes (110) and onto the diffuser plate (115). In an example, once each of the holes (110) have been choked, a first layer of build material used to form the 3D object may be laid down. In some examples, the build material used to initially choke the holes (110) may be used to also form the initial build layer of the 3D object. In some examples, an entirely new layer of build material may be placed over the build material used to choke the holes (110).

Fusing agents may be selectively placed on the initial layer of build material. The locations of where the coalescent fluid is placed may define an initial layer of a 3D object to be printed. An electromagnetic source is then provided to direct an electromagnetic beam at least at the locations where the coalescent fluid had been placed. The coalescent fluid may cause, in conjunction with the energy, the melting, sintering, fusing, or otherwise coalescence of the build material at that location thereby forming the initial layer of the 3D object. A new layer of build material is layered over the initial build material layer/coalesced material in preparation to form a subsequent layer of the 3D object. This process is repeated any number of times with each layer of build material and coalescent fluid defining a layer of the 3D object being formed. The process stops when a final layer of the 3D object has been defined via coalescing the final amount of coalescent fluid in the final layer. However, the unfused or uncoalesced build material may be hot due to the process described above but will have to be removed in order to reveal the finished 3D object.

According to the present specification, however, a user does not transport the layers of build material and 3D object to another machine. Instead, the holes (110) defined in the build platform (105), the diffuser plate (115), and the flow channel (120) serve to help remove the unused build material. As described, the initial layer of build material may be layered on the build platform (105). As this occurs, an extra amount of build material may be layered because a portion of the build material is allowed to pass through the at least one hole (110) defined in the build platform (105) and accumulate on an upper surface of the diffuser plate (115). Eventually, the build material may fill up on top of the diffuser plate (115) until the pile reaches the bottom surface of the build platform (105) thereby clogging or choking the hole (110). In this case, the build material fills the remaining portion of the at least one hole (110) and the build material is layered generally uniformly on the top surface of the build platform (105). The pile formed in between the bottom surface of the build platform (105) and the top surface of the diffuser plate (115) remains until the 3D object has been formed as described above.

After the 3D object has been built, the unused build material may be allowed to pass through the at least one hole (110) defined in the build platform (105) as air is passed through a flow channel (120) encompassing the diffuser plate (115). As the air flows through the flow channel (120), the build material piled up and the build material continued to build up on the top surface of the diffuser plate (115) may be blown away. The air may continue to flow through the flow channel (120) until all of the unused build material has been removed from off the top surface of the build platform (105) leaving the 3D object left.

In an example, the build platform (105) may further include a vibration device that vibrates the build platform (105) during the unused build material evacuation process described herein. The vibration from the vibration device causes the unused build material to move across the surface of the build platform (105) and be dislodged from off of the surface of the 3D object formed. Because the build material moves across the surface of the build platform (105), the chance of the unused build material falling through the hole (110) may be increased or at least the build material will not remain in a single location on the build platform (105). Instead, the unused build material will eventually be vibrated to the hole (110) and be allowed to fall therethrough.

The flow channel (120) may further include an air inlet and an air outlet. The air inlet and outlet may be placed in opposite ends (e.g., proximal and distal ends, respectively) of the flow channel (120) so that air may be passed over or at least about the entire surface of the diffuser plate (115). This causes the air to push the piles of build material toward the air outlet and out of the flow channel (120). A build material collection device may collect the unused build material as it exits the flow channel (120) in order to use it in a later 3D object building process described herein. In an example, the air inlet may be situated so as to cause the airflow to pass substantially between the bottom surface of the build platform (105) and the top surface of the diffuser plate (115). In this example, the airflow may remove the build material that accumulates between the build platform (105) and diffuser plate (115). In an example, the air inlet may include an airflow adjustment device used to throttle or adjust the airflow within the flow channel (120). This allows the air flow to be balanced within the flow channel (120) so as to optimize performance of the build material removal. During operation, a relatively greater amount of airflow is generated through the air inlet with a small amount of air flowing in through the hole (110) defined in the build platform (105). Thus, the airflow within the flow channel (120) produces a relatively greater evacuation of the build material than air passing through the hole (110).

The air provided through the flow channel (120) may be provided using an air compressor or some other air pump or airflow generation device. In some examples, the air pump may be activated simultaneously with the vibration device. In another example, the vibration device and air pump may be synchronously activated creating periods of vibration followed by periods of air flow through the flow channel (120). In yet another example, the vibration device may be activated both while the air pump is activated and while the air pump is not activated. In another example, vibration device and air pump may be activated independently of each other. In an example, the vibration device and air pump may be engaged consecutively among each other.

The flow channel (120) may seal the diffuser plate (115) from atmosphere during the 3D object building process. In an example, the flow channel (120) envelops the diffuser plate (115) entirely such that as the build material accumulates on top of the diffuser plate (115) and when the air inlet and outlet are sealed, the diffuser plate (115) is sealed off from the atmosphere. During the build material removal process, however, the air inlet and outlet may open the cavity formed between the flow channel (120) and bottom side of the build platform (105) to atmosphere in order to remove the build material as described herein.

The 3D printing system (100) may further include an elevator system that allows the build platform (105), diffuser plate (115), and flow channel (120) assembly to move vertically as additional layers of build material and coalescent fluid are stacked on the top surface of build platform (105). As the number of layers increases, the elevator system may move the build platform (105), diffuser plate (115), flow channel (120) assembly down in order to provide access to the layer by the ejection device as well as maintain a consistent distance between the layer surface and the electromagnetic source.

For additional functionality, the 3D printing system (100) may further include a number of processors, a number of data storage devices, a number of peripheral device adapters, and a number of network adapters. These hardware components may be interconnected through the use of a number of busses and/or network connections. In one example, the processor, data storage device, peripheral device adapters, and a network adapter may be communicatively coupled via a bus.

The processor may include the hardware architecture to retrieve executable code from the data storage device and execute the executable code. The executable code may, when executed by the processor, cause the processor to implement at least the functionality of building a 3D object and evacuate from the 3D printing system (100) an amount of unused build material, according to the methods of the present specification described herein. In the course of executing code, the processor may receive input from and provide output to a number of the remaining hardware units.

The data storage device may store data such as executable program code that is executed by the processor or other processing device. The data storage device may specifically store computer code representing a number of applications that the processor executes to implement at least the functionality described herein. The data storage device may include various types of memory modules, including volatile and nonvolatile memory. For example, the data storage device of the present example includes Random Access Memory (RAM), Read Only Memory (ROM), and Hard Disk Drive (HDD) memory. Many other types of memory may also be utilized, and the present specification contemplates the use of many varying type(s) of memory in the data storage device as may suit a particular application of the principles described herein.

In certain examples, different types of memory in the data storage device may be used for different data storage needs. For example, in certain examples the processor may boot from Read Only Memory (ROM), maintain nonvolatile storage in the Hard Disk Drive (HDD) memory, and execute program code stored in Random Access Memory (RAM). Generally, the data storage device may comprise a computer readable medium, a computer readable storage medium, or a non-transitory computer readable medium, among others.

The hardware adapters in the 3D printing system (100) enable the processor to interface with various other hardware elements, external and internal to the 3D printing system (100). For example, the peripheral device adapters may provide an interface to input/output devices, such as, for example, display device, a mouse, or a keyboard. The peripheral device adapters may also provide access to other external devices such as an external storage device, a number of network devices such as, for example, servers, switches, and routers, client devices, other types of computing devices, and combinations thereof.

The display device may be provided to allow a user of the 3D printing system (100) to interact with and implement the functionality of the 3D printing system (100); namely printing a 3D object and evacuating from the 3D printing system (100) and amount of unused build material. The peripheral device adapters may also create an interface between the processor and the display device or other media output devices. The network adapter may provide an interface to other computing devices within, for example, a network, thereby enabling the transmission of data between the 3D printing system (100) and other devices located within the network.

The 3D printing system (100) may, when executed by the processor, display the number of graphical user interfaces (GUIs) on the display device associated with the executable program code representing the number of applications stored on the data storage device. The GUIs may display, for example, various interfaces for a user to select a type of 3D object to be printed and further select a build material evacuation process according to eh examples and principles described herein.

Figure 2A:
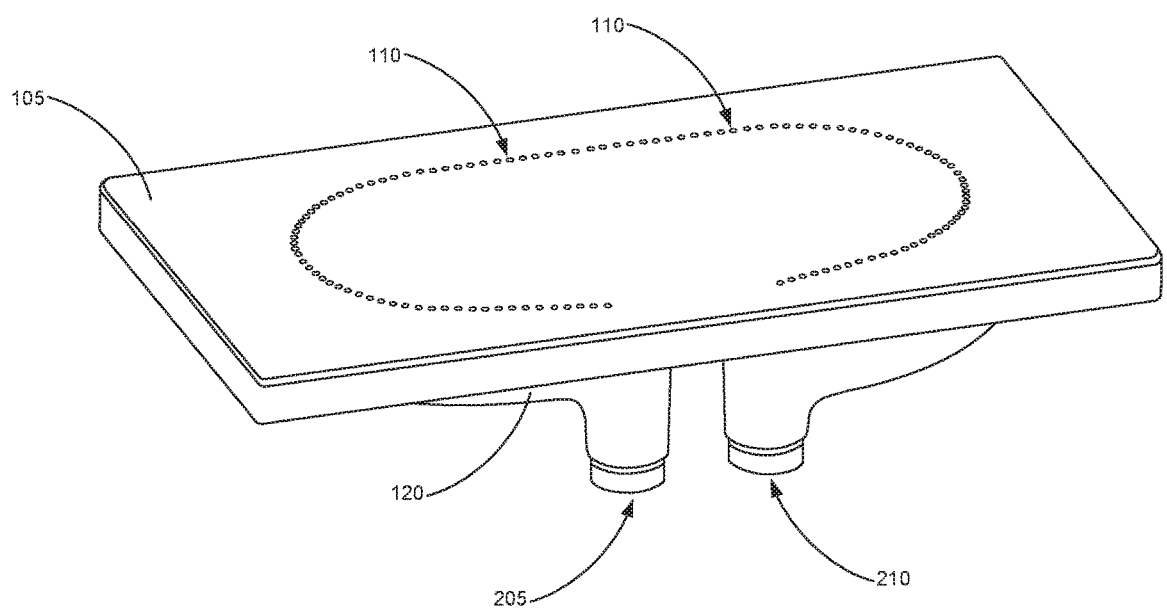
FIG. 2A is an isometric top view of the top surface of the build platform according to an example of the principles described herein.
Figure 2B:
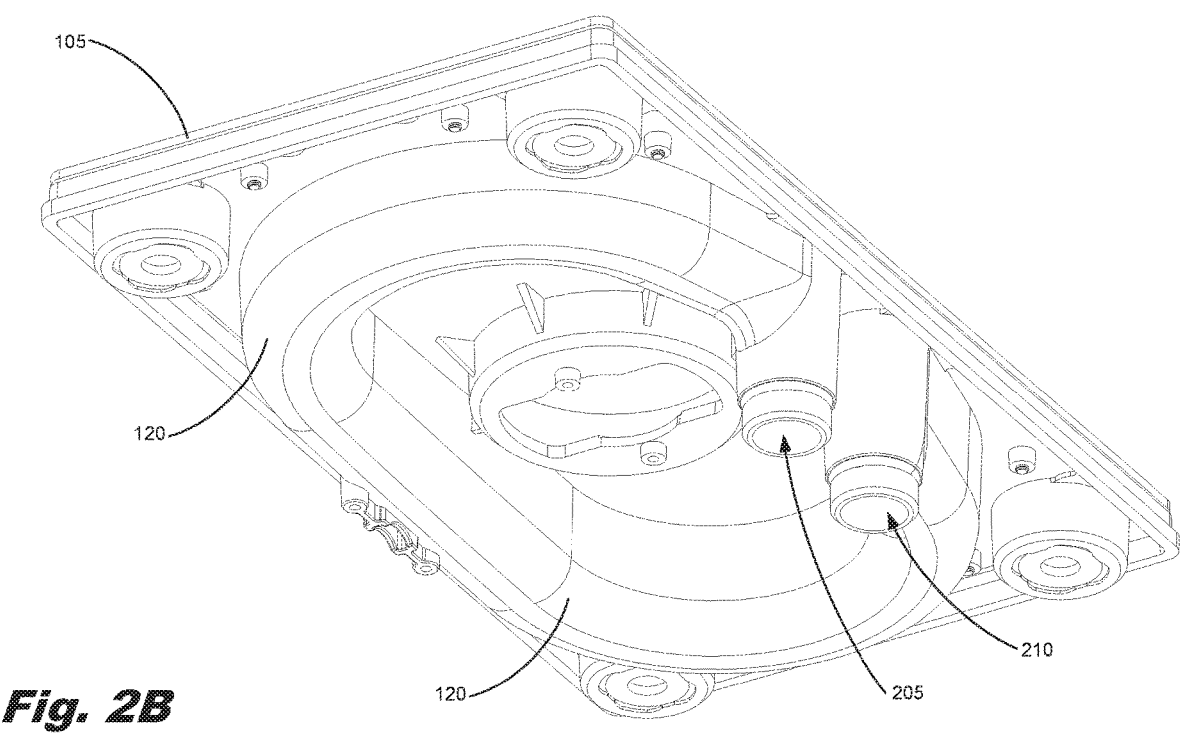
FIG. 2B is an isometric bottom view of the build platform showing the flow channel according to an example of the principles described herein.
Figure 2C:
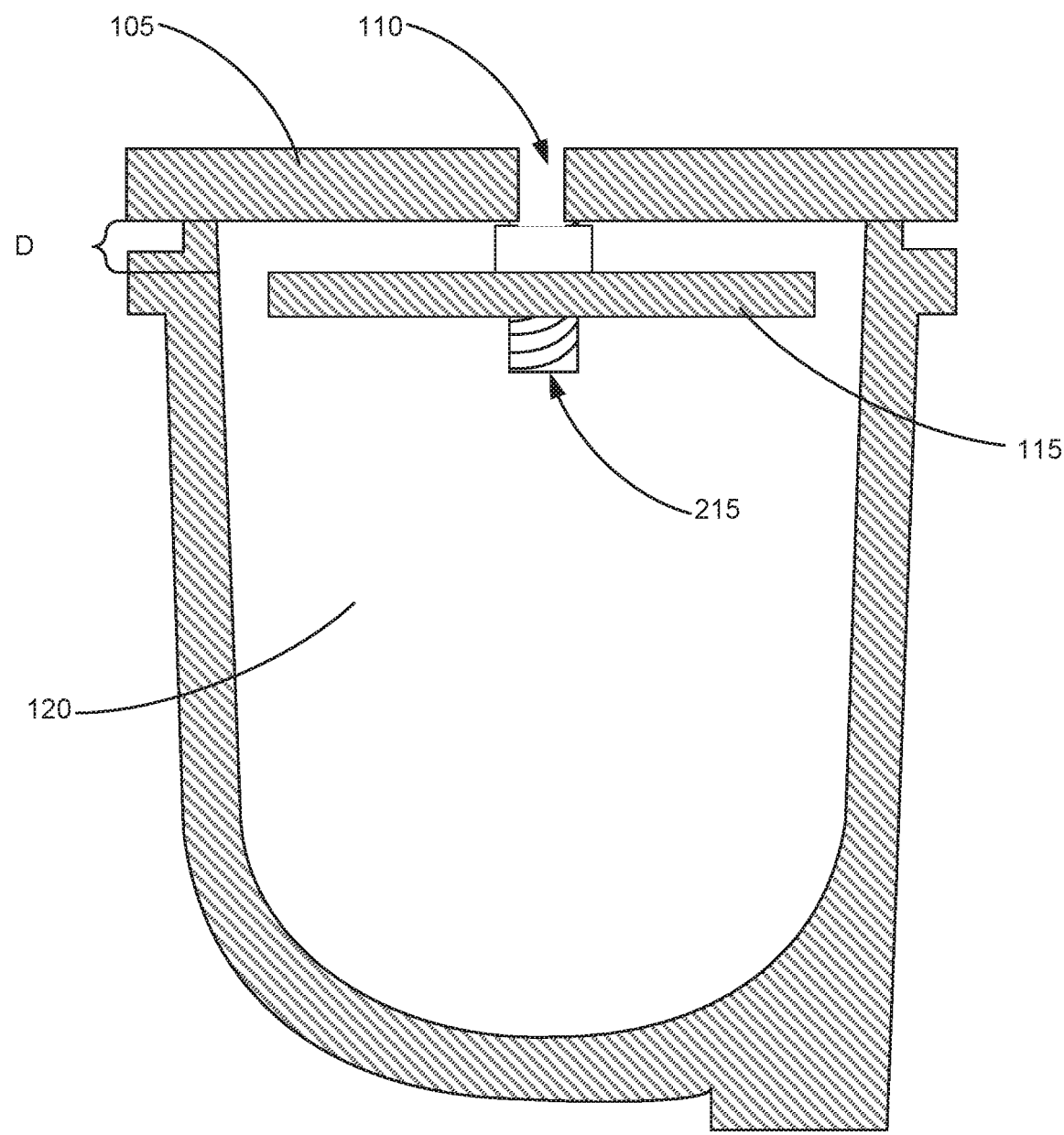
FIG. 2C is a cut-out view of the build platform, hole, diffuser plate, and flow channel according to an example of the principles described herein.

FIGS. 2A, 2B, and 2C are various views of the build platform (105), holes (110), diffuser plate (115), and flow channel (120) as described herein. FIG. 2A is an isometric top view of the top surface of the build platform (105) according to an example of the principles described herein. FIG. 2B is an isometric bottom view of the build platform (105) showing the flow channel (120) according to an example of the principles described herein. FIG. 2C is a cut-out view of the build platform (105), hole (110), diffuser plate (115), and flow channel (120) according to an example of the principles described herein.

Turning now to FIGS. 2A and 2B, the build platform (105) is shown here to have a plurality of holes (110) defined therein. According to the example shown in FIG. 2A, these holes (110) have been formed into a semicircle along the top surface of the build platform (105). This formation of holes (110) is meant to be understood as an example and the present specification contemplates that the holes (110) may be of any pattern. In some examples, the pattern of the holes (110) follows an outline of the air flow path created by the flow channel (120). Again, in the example shown in FIG. 2A and also FIG. 2B, the flow channel (120) follows the layout of the holes (110) defined through the build platform (105). This allows, during operation of the 3D printing system (100), for air to flow through the flow channel (120) at a location where the build material will fall through the holes (110).

The build platform (105) and flow channel (120) assembly shown in FIGS. 2A and 2B also includes and air inlet (205) and an air outlet (210). A hose may be used to fluidically couple the air inlet (205) to an air pump such as a compressor. A hose may also fluidically couple the air outlet (210) to a discharge location. The discharge location may include a vacuum or other device that can accept an airflow. The discharge location may further include a build material collection device to collect the unused build material for recycling or reuse. The build material collection device may include any air filter or other particle trapping device that can maintain an amount of build material.

Although FIGS. 2A-2C show a single air inlet fluidically coupled to a single flow channel (120) and air outlet (210), the present specification contemplates the use of multiple air inlets (205), flow channels (120), and/or air outlets (210). As an example, a plurality of air inlets (205) may be fluidically coupled to a plurality of flow channels (120) that merge into a single air outlet (210). In an example, a single air inlet (205) may be fluidically coupled to a flow channel (120) that diverges into a plurality of air outlets (210). In an example, a single air inlet (205) may be fluidically coupled to a flow channel (120) that diverges and then converges into a single air outlet (210). Indeed, numerous examples may be formulated that contemplate the use of single or a plurality of air inlets (205), air outlets (210), and/or flow channels (120) and the present specification contemplates such examples. In any example, where a plurality of air inlets (205) are used, each air inlet (205) may be individually fluidically coupled to an air pump. Alternatively, each of the air inlets (205) may be fluidically coupled to a common air pump. In any example, where a plurality of air outlets (210) are used, each air outlet (210) may be coupled to a build material reception device. Alternatively, each air outlet (210) may be fluidically coupled to a single build material reception device.

FIG. 2C is a cut-out view of the build platform (105), hole (110), diffuser plate (115), and flow channel (120) according to an example of the principles described herein. FIG. 2C shows the flow channel (120) completely encompassing the diffuser plate (115) housed within the sealed portion between the build platform (105) and the flow channel (120). In the example shown in FIG. 2C, the direction of airflow may be out of the page. The hole (110) is defined above the diffuser plate (115) so as to allow an amount of build material to accumulate on the top surface of the diffuser plate (115) during operation of the 3D printing system (100).

The diffuser plate (115) may further include an adjustment device (215) that can be used to adjust the distance (D) between the bottom surface of the build platform (105) and the top surface of the diffuser plate (115). Adjustment of this distance (D) provides for the use of different types and sizes of build material to be used. In some examples, the distance (D) may be increased or decreased based on the properties of the build material so that the build material may deliberately accumulate on the top surface of the diffuser plate (115). This, in turn, causes a deliberate clogging of the hole (110). Consequently, a generally uniform layer of build material may be formed on the top surface of the build platform (105) without dips occurring at the locations of the holes (110). The adjustment device (215) may be any type of device that can lower or raise the diffuser plate (115). In the example show in FIG. 2C, the adjustment device (215) is a nut that may be turned counterclockwise or clockwise in order to raise or lower the diffuser plate (115), respectively. Other adjustment devices (215) may be used to accomplish the same objective and the present specification contemplates the use of these other types of adjustment devices (215).

Figure 3:
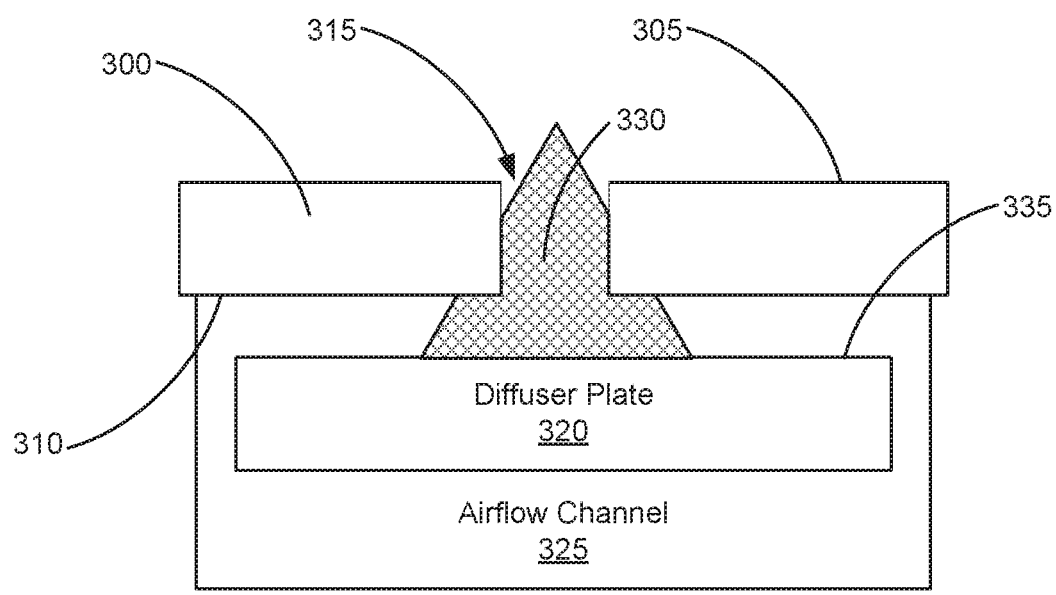
FIG. 3 is a block diagram of a build platform according to an example of the principles described herein.

FIG. 3 is a block diagram of a build platform (300) according to an example of the principles described herein. The build platform (300) may include a first surface (305), a lower second surface (310), and at least one hole (315) defined through the build platform (300). A diffuser plate (320) may be adjustably coupled below the at least one hole (315). An airflow channel (325) may be defined around the diffuser plate (320) sealing the diffuser plate (320) within the airflow channel (325) and build platform (300) interface.

As described above, the airflow channel (325) may close off the diffuser plate (320) from atmosphere as the air inlet and air outlet are closed and an amount of build material (330) has been accumulated onto the top surface (335) of the diffuser plate (320). The distance (D) between the bottom surface of the build platform (300) and the top surface of the diffuser plate (320) may be increased or decreased based on a number of factors. Example factors that may dictate the distance (D) may include the size of granules of build material used in the 3D printing process, the surface tension of the build material used in the 3D printing process, the distance between the holes (110) in the build platform (300), and the width and length of the diffuser plate (320) among other factors. In some examples, the distance (D) is between 3 and 2 mm. In an example, the distance (D) is 2.5 mm. In some examples, two or more layers may be added to the top surface of the build platform (300). The number of layers may also depend on the size of granules of build material used in the 3D printing process, the surface tension of the build material used in the 3D printing process, the distance between the holes (110) in the build platform (300), and the width and length of the diffuser plate (320) among other factors. In some examples, the number of layers placed on the top surface of the build platform (300) is 50-100.

After the building process of the 3D object has been completed, the evacuation of the unused build material may begin. Air may be flowed through the airflow channel (325) causing the accumulated build material (330) to be pushed off from the top surface (335) of the diffuser plate (320) while additional amounts of build material (330) is allowed to fall through the hole (315). Again, as the flow of build material (330) begins to slow, a vibration device may be activated causing any remaining excess build material (330) still present on the first surface (305) of the build platform (300) to be moved towards the hole (315) and through it.

Figure 4:
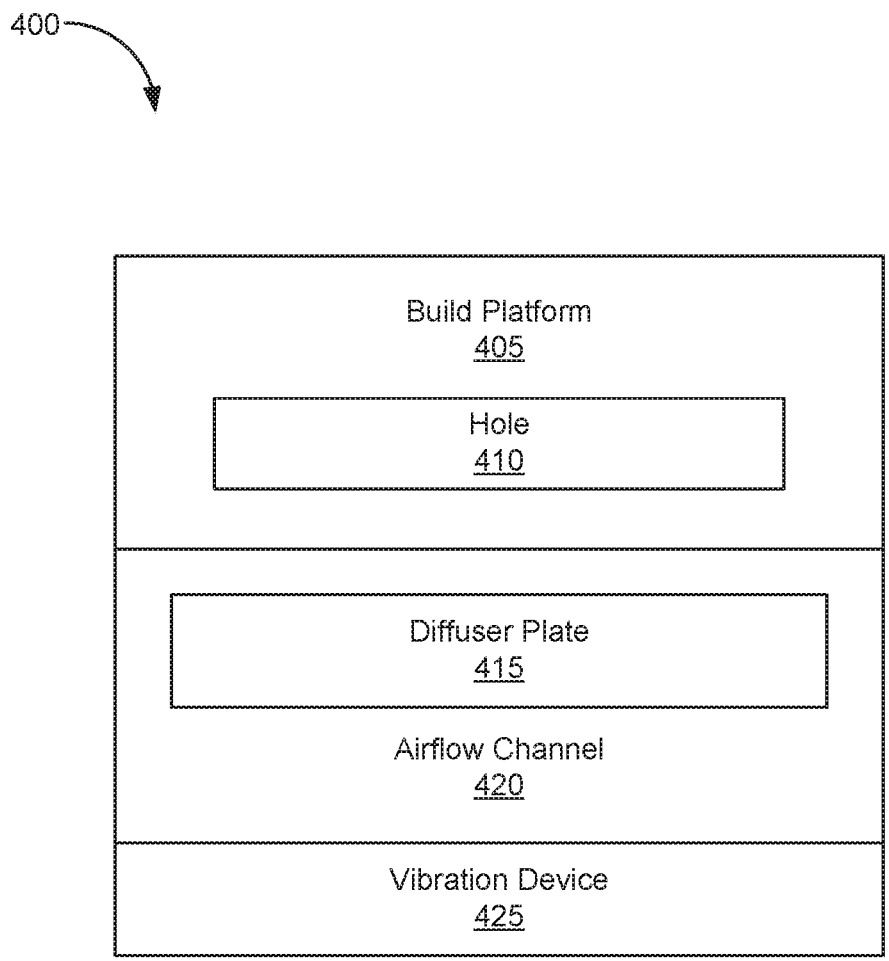
FIG. 4 is a block diagram of a 3D object printing system according to an example of the principles described herein.

FIG. 4 is a block diagram of a 3D object printing system (400) according to an example of the principles described herein. The 3D object printing system (400) may include a build platform (405) with at least one hole (410) defined therethrough, a diffuser plate (415) adjustably coupled below the at least one hole (410), and an airflow channel (420) defined around the diffuser plate (415) and sealed against the bottom surface of the build platform (405). These devices may be similar to those described herein in connection with FIGS. 1 and 2A-2C.

The 3D object printing system (400) may further include a vibration device (425) to cause the build platform (405) to selectively be vibrated. The vibration device (425), in an example, may include a rod and weight with the rod being mechanically coupled to the build platform (405) and the weight being used to impart the vibration from the rod to the build platform (405).

As mentioned above, the vibration device (425) may be activated at certain times during a build material evacuation process. In some examples, the vibration device (425) may be activated while air is being passed through the airflow channel (420). In some examples, the vibration device (425) may be intermittingly activated while the air is being passed through the airflow channel (420).

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general-purpose computer, special purpose computer, or other programmable data processing apparatus to produce a machine, such that the computer usable program code, when executed via, for example, the processor of the 3D printing system (100) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The specification and figures describes a 3D printing device that builds the 3D object and removes the build material bed after the build process using the same build chamber. This in situ removal of the unused or otherwise un-coalesced build material from the 3D object after the printing process has been completed allows for a device that does not use extraneous devices to finish the product. Instead, a user may use the 3D printing device to both build the 3D object and remove the extraneous build material without further interference or interaction by the user. Further, the unused build material extracted from the 3D object using the 3D printing system described herein, may allow a user to recycle the unused build material using the same device. This results in the build material not being transported from one device to another and further reduces the complexity and operating costs of the 3D printing system. The inside of the 3D printing system may be continually cleaned of unused build material by its design and the scouring action of the inlet air through the flow channel. The self-clogging aspect of the diffuser plate under the hole replaces the use of any mechanical valve to actuate build material flow. The airflow resulting from the design of the flow channel may be maintain a consistent airflow throughout thereby having a consistent removal process of build material.

The preceding description has been presented to illustrate and describe examples of the principles described. This description is not intended to be exhaustive or to limit these principles to any precise form disclosed. Many modifications and variations are possible in light of the above teaching.

What is claimed is:

1. A three-dimensional printing system, comprising:
   a build platform comprising at least one hole defined through the build platform;
   a diffuser plate placed below the at least one hole to maintain an amount of build material between a lower surface of the build platform and an upper surface of the diffuser plate during a building process, the diffuser plate fixed a set distance below the lower surface of the build platform; and
   a flow channel defined around the diffuser plate, the diffuser plate being disposed in the flow channel, the flow channel extending in parallel with the upper surface of the diffuser plate, the flow channel shaping an air flow laterally between the diffuser plate and build platform to remove build material from the upper surface of the diffuser plate;
   wherein the flow channel includes at least one air inlet port at a proximal end of the flow channel and at least one air outlet port at a distal end of the flow channel.

2. The three-dimensional printing system of claim 1, further comprising a vibration device to vibrate, at least, the build platform.

3. The three-dimensional printing system of claim 2, further comprising an air pump fluidically coupled to the flow channel to flow an amount of air through the flow channel.

4. The three-dimensional printing system of claim 3, wherein the air pump and vibration device are activated during a build material removal process.

5. The three-dimensional printing system of claim 4, wherein the vibration device and air pump are not activated simultaneously, are activated simultaneously, activated concurrently, activated independently, activated consecutively, or a combination thereof.

6. The three-dimensional printing system of claim 1, wherein the diffuser plate comprises an adjustment device to adjust the distance of the upper surface of the diffuser plate and the lower surface of the build platform.

7. A build platform assembly, comprising:
   a build platform having a first surface, a lower second surface, and at least one hole defined through the build platform;
   a diffuser plate adjustably coupled below the at least one hole to maintain an amount of build material between a lower surface of the build platform and an upper surface of the diffuser plate during a building process, the diffuser plate fixed a set distance below the lower surface of the build platform; and
   an airflow channel defined around the diffuser plate and sealed against the second surface of the build platform, the diffuser plate being disposed in the airflow channel, the airflow channel extending in parallel with an upper surface of the diffuser plate, the airflow channel shaping an air flow laterally between the diffuser plate and build platform to remove build material from the upper surface of the diffuser plate;
   wherein the airflow channel includes at least one air inlet port at a proximal end of the airflow channel and at least one air outlet port at a distal end of the airflow channel.

8. The three-dimensional printing system of claim 1, further comprising:
   a vibration system coupled to the build platform to impart a vibration to the build platform during a build material removal process; and
   a processor programmed to operate the vibration system and an air pump of the airflow channel such that the vibration system and air pump are activated synchronously and not activated simultaneously.

9. A three-dimensional printing system, comprising:
   a build platform comprising at least one hole defined through the build platform;
   a diffuser plate placed below the at least one hole to maintain an amount of build material between a lower surface of the build platform and an upper surface of the diffuser plate during a building process, the diffuser plate fixed a set distance below the lower surface of the build platform;
   a flow channel defined around the diffuser plate, the diffuser plate being disposed in the flow channel, the flow channel extending in parallel with the upper surface of the diffuser plate, the flow channel shaping an air flow laterally between the diffuser plate and build platform to remove build material from the upper surface of the diffuser plate; and
   an airflow generation device fluidically coupled to an inlet and outlet port along the flow channel to produce an airflow through the flow channel and across a top surface of the diffuser plate.

10. The three-dimensional printing system of claim 1, wherein the diffuser plate is adjustable with regard to a distance maintained between the diffuser plate and the build platform.

11. The three-dimensional printing system of claim 1, further comprising:
a vibration device to cause the build platform to vibrate.

12. The three-dimensional object printing system of claim 1, further comprising an airflow generation device to deliver an airflow through the air inlet and outlet ports of the flow channel.

13. The three-dimensional object printing system of claim 2, wherein the vibration device comprises a vibration rod mechanically coupled to a lower surface of the build platform to impart a vibration to the build platform during a build material removal process.

14. The three-dimensional object printing system of claim 11, wherein the adjustable diffuser plate is adjustable with regard to the distance maintained between the diffuser plate and the build platform.

15. The three-dimensional printing system of claim 1, wherein the flow channel includes a flow pathway between the diffuser plate and the build platform, the system further comprising a pump to pump air through the flow pathway to push build material laterally from between the diffuser plate and build platform.

16. The three-dimensional printing system of claim 1, wherein the build platform comprises a powder bed to receive a powdered build material, and the diffuser plate is spaced a distance from the build platform to allow a quantity of powdered build material to spill through the at least one hole in the build platform and accumulate on the diffuser plate until the at least one hole is choked with powdered build material.

17. The three-dimensional printing system of claim 1, wherein the flow channel is formed in a loop beneath the build platform with an inlet adjacent to an outlet, the build platform comprises a pattern of holes arranged in a loop around the build platform, and wherein the pattern of holes follows an outline of an air flow path created by the flow channel in the loop underneath the build platform.

18. The three-dimensional printing system of claim 1, further comprising an adjustment device to adjust a distance between the diffuser plate and the build platform based on a property of the build material to be used.

19. The three-dimensional printing system of claim 18, wherein the adjustment device comprises a nut rotated to raise or lower the diffuser plate relative to the build platform.

* * * * *